Aug. 2, 1949.  H. M. GEHL  2,477,795
MACHINE FOR GATHERING HAY AND CONDITIONING
IT FOR ANIMAL FOOD
Filed Dec. 30, 1943  4 Sheets-Sheet 1

INVENTOR.
HENRY M. GEHL.
BY William F. Buckley
ATTORNEY.

Aug. 2, 1949.  H. M. GEHL  2,477,795
MACHINE FOR GATHERING HAY AND CONDITIONING
IT FOR ANIMAL FOOD
Filed Dec. 30, 1943  4 Sheets-Sheet 2
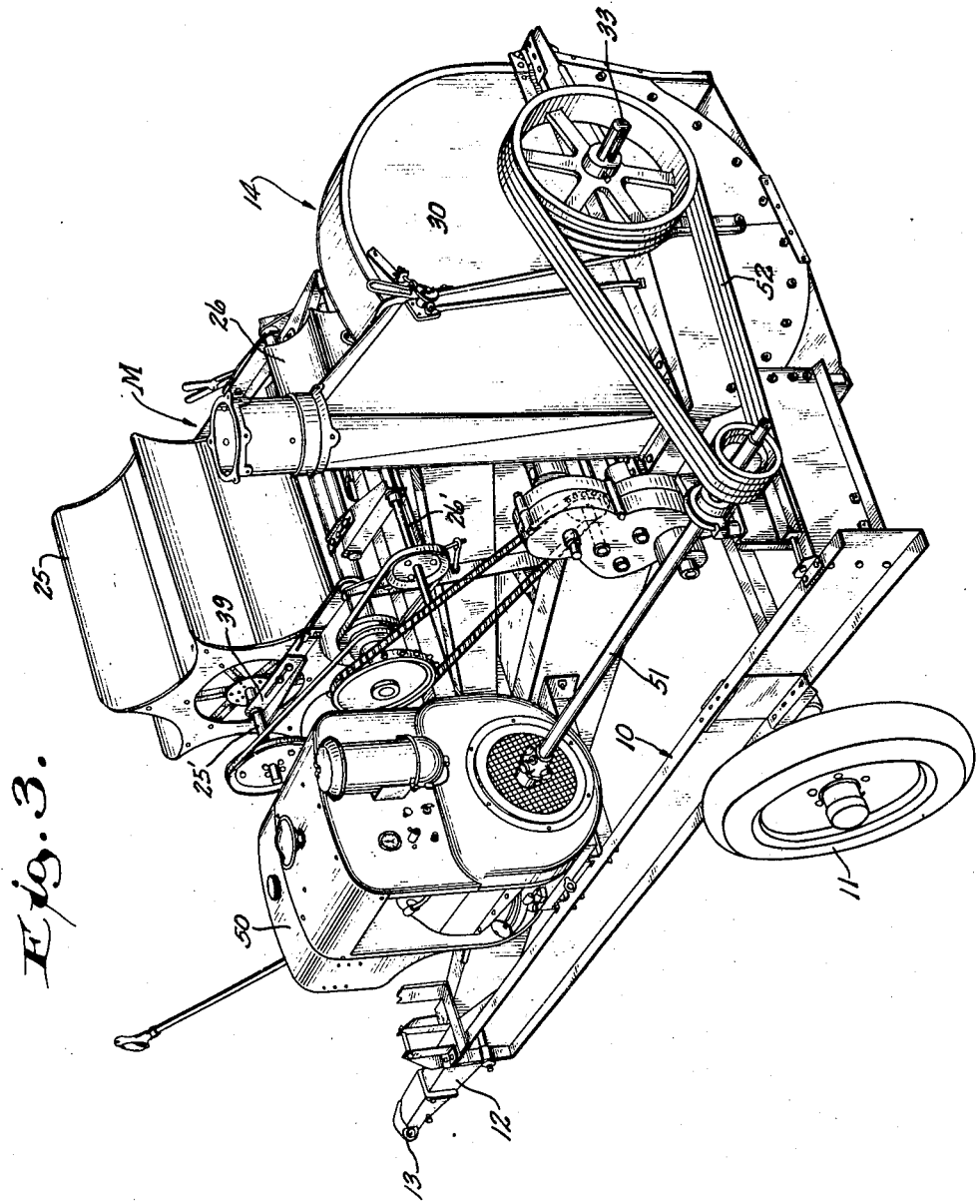
INVENTOR.
HENRY M. GEHL.
BY
William F. Buckley.
ATTORNEY.

Aug. 2, 1949.  H. M. GEHL  2,477,795
MACHINE FOR GATHERING HAY AND CONDITIONING
IT FOR ANIMAL FOOD
Filed Dec. 30, 1943  4 Sheets-Sheet 3
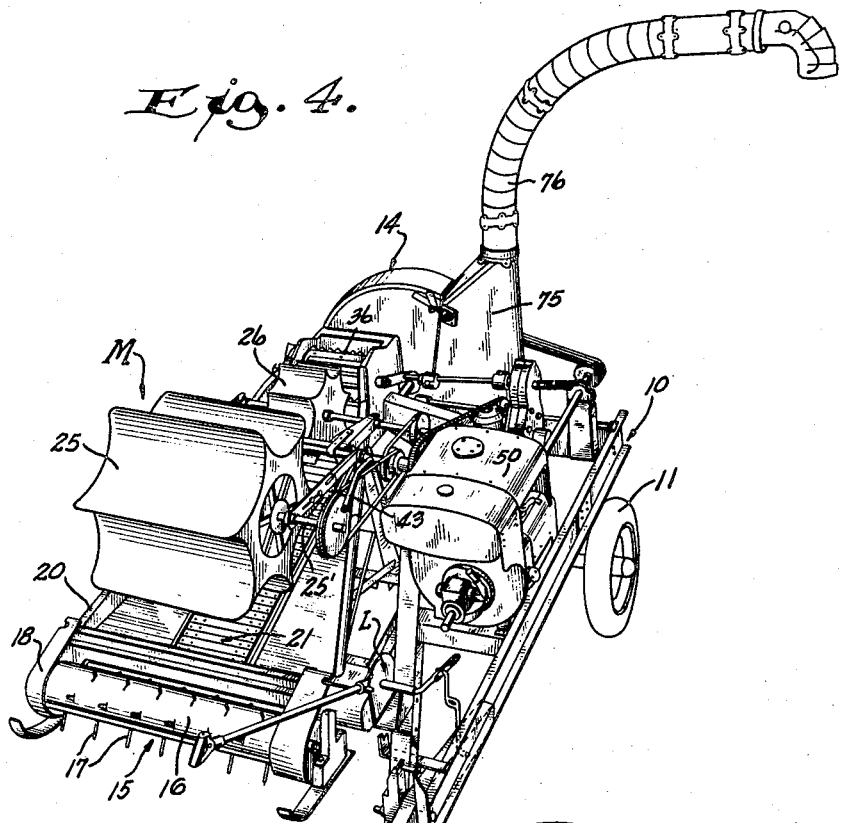
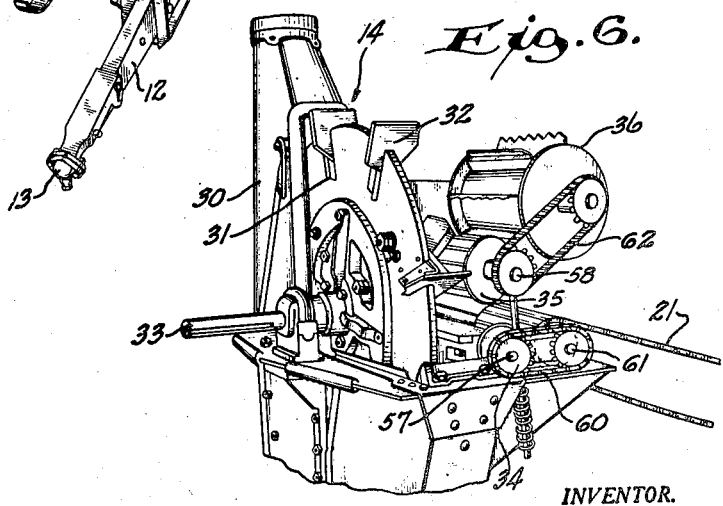
INVENTOR.
HENRY M. GEHL.
BY William F. Buckley
ATTORNEY.

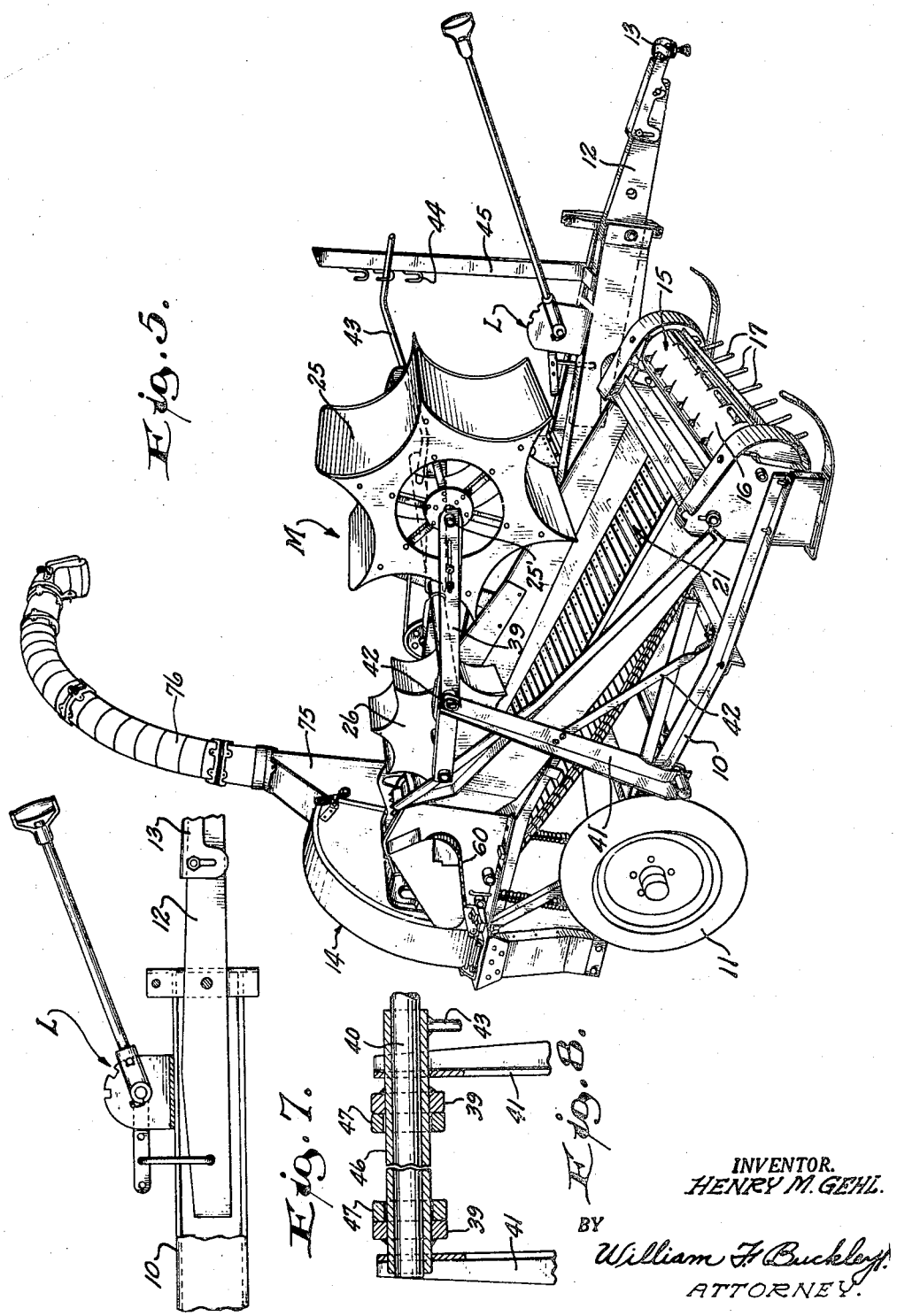

Patented Aug. 2, 1949

2,477,795

UNITED STATES PATENT OFFICE 2,477,795

MACHINE FOR GATHERING HAY AND CONDITIONING IT FOR ANIMAL FOOD

Henry M. Gehl, West Bend, Wis., assignor to Gehl Bros. Manufacturing Co., West Bend, Wis., a corporation of Wisconsin Application December 30, 1943, Serial No. 516,144

19 Claims. (Cl. 56—16)

This invention relates to a machine for gathering hay and cutting it up into feed or ensilage suitable to be stored in a barn or silo and to be utilized in the condition that it is prepared by the machine for food for the stock or cattle on a farm.

In this branch of agriculture the hay standing in the field is first cut and then raked into windrows. After this has been done it still must be gathered and chopped up so as to be in condition for use as animal food. Sometimes considerable acreage is involved and the machines or facilities available for gathering and chopping up the hay as well as the man power available must be used to maximum advantage or efficiency.

The broad or general object of the present invention is to meet the requirements of this problem in a practical way and to best advantage.

Accordingly, the present invention proposes a hay conditioning machine comprising a wheeled or mobile frame having hay pickup means at its forward end, a hay chopper preferably of the ensilage cutter type at the rear end thereof, a feed trough extending from the hay pickup means to the chopper or cutter, a feed apron or endless belt for advancing the picked up hay through the feed trough to the cutter, and in addition and of prime importance, mechanism for controlling the rate of feed of the hay through the feed trough to the cutter. This particular mechanism comprises a pair of beater or feed rolls which overlie the feed trough and which function to accumulate a surplus or pile of hay between them to pack the hay and to advance the hay to the cutter.

The reason for the provision of the beater or feed rolls is that with the instrumentalities or machines available and the unbalance in their power ratings or capacities, there is need for some means to coordinate their action. To be more specific, a practical driving speed across the field on which hay has been cut and raked is three miles per hour. With regard to the economy of the ordinary farmer and to the available facilities this speed is excessive for the capacity of commercially available ensilage cutters and a practical mechanism for feeding the hay picked up to the cutter. By virtue of the provision of the feed or beater rolls constituted and organized as will be hereinafter more fully described, it is practical and efficient to gather the hay under the propulsion of the tractor at a ground speed of three miles per hour and to chop it up by the available ensilage cutter at an efficient rate of speed of the cutter, and to do this while maintaining normal and efficient feeding or conveying speeds.

The gist of the invention resides in the fact that the feed or beater rolls, while assisting the endless conveyor or feed apron to feed the hay from the hay pickup means to the ensilage cutter, also are capable of, and do accumulate a surplus of hay or pile it up into a sort of transient hay stack, which is compacted preparatory to feeding the same to the ensilage cutter.

Another object of the invention is to provide a machine of this character and having capacities and advantages mentioned and which is nevertheless simple, compact, closely organized, and durable in construction, reliable and efficient in operation, and easy and comparatively inexpensive to manufacture, operate, and maintain.

These objects of the invention and other ancillary advantages are attained by the mechanism, construction, and arrangement illustrated in the accompanying drawings forming part hereof, in which:

Fig. 3 is a perspective view of the hay machine viewing it from one side and from the rear;

Fig. 4 is a perspective view of the machine viewing it from one side and from the front;

Fig. 5 is a perspective view of the machine similar to Fig. 4 but viewing it from the opposite side but also still from the front;

Fig. 6 is a fragmentary perspective view illustrating the cutter or hay chopper and the feed and beater rolls associated with the inlet to the cutter, a portion of the blower housing and part of the supporting structure of the rolls being omitted for the sake of illustration;

Fig. 7 is a view partly in longitudinal vertical cross section and partly in side elevation taken approximately on line 7—7 of Fig. 2; and Fig. 8 is a fragmentary detail view in vertical transverse cross section taken on line 8—8 of Fig. 2.

General construction

Figure 1:
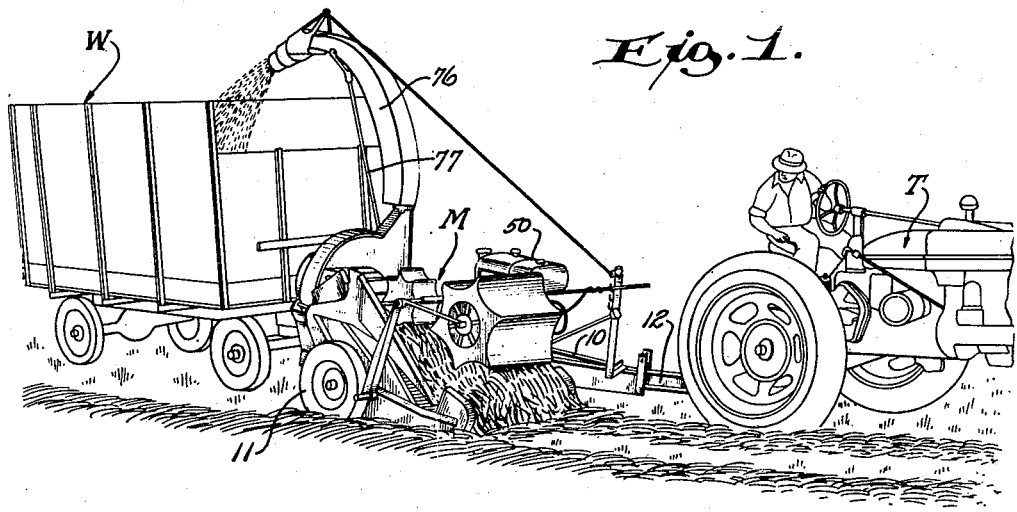
Fig. 1 is a perspective view of a hay machine embodying the present invention, the machine being shown connected to the tractor which pulls it across the field and also operatively associated with the trailer or wagon into which the cut or chopped hay is blown.

Referring to the drawing and more particularly to Fig. 1 reference character M designates the hay machine as a whole. The machine M is pulled across the field and along windrows of previously cut and raked hay by means of a tractor designated as a whole at T and suitably hitched to the machine M. In the construction illustrated a trailer or wagon W is connected up to the rear end of the machine M and receives the cut or chopped hay blown from the machine.

The machine M comprises generally a suitable frame or chassis 10 supported on a pair of ground wheels 11. A draw bar 12 is operatively interconnected with the chassis 10 at one side thereof and projects from the forward end of the chassis. A suitable pivot and manually operable lift mechanism L (see Fig. 7) is provided for the operative interconnection of the draw bar and chassis. The draw bar 12 is connected up to the tractor in any suitable way, as for example, by means of a hitch illustrated diagrammatically at 13.

A hay cutter or chopper designated generally at 14 is supported on the chassis 10 at the rear end thereof. This hay cutter or chopper usually takes the form of an ensilage cutter equipped with the suitable blades and fans. It extends only part way across the rear end of the chassis and is located on the opposite side of the machine from the draw bar 12.

Hay gathering means designated generally at 15 is supported at the forward end of the machine adjacent the ground and is adapted to pick up or gather the hay from the windrows as the machine is pulled across the field, the hay having been previously cut and raked.

The hay gathering means comprises a rotary drum or roller 16 equipped with rows of pickup fingers 17. The ends of the drum or roller 16 has trunnions which are rotatably supported on suitable bearings provided therefor in bearing brackets 18 fastened to the lower part of the forward end of the chassis 10. At least one of the trunnions receives the drive or power through chain and sprocket gearing 19 (see Fig. 2) which is utilized to rotate the drum 16.

A feed trough designated generally at 20 extends from the pickup drum 15 upwardly and rearwardly to the inlet of the cutter or hay chopper 14. An endless feed conveyor or apron 21 extends longitudinal of the trough, the upper run of the endless conveyor or apron being accommodated in a suitable longitudinal opening in the center of the trough and extending from a point adjacent the pickup drum 15 and adjacent the forward end of the feed trough, up to the inlet of the hay chopper or cutter 14. The upper run of this endless feed conveyor or apron travels upwardly through the feed trough and aids in conveying the picked up hay to the hay cutter or chopper 14. The hay deposited in feed trough 20 by the pick-up 15 is loose and bulky, and since the periphery of roller 16 moves at a faster rate than does conveyor belt 21, the hay tends to pile up on the conveyor.

The present invention provides a hay packer which compresses the hay upon the conveyor and effects feeding of a tightly compacted mass of hay upwardly into cutter 14. For this purpose one or more power driven feed drums are mounted in a floating manner above the conveyor 21.

In the machine illustrated the conveyor 21 is of sufficient length to require two feed drums operating in series. These drums comprise a large rotary beater or feed drum 25 overlying the pick-up 15 and the cooperable small rotary beater or feed drum 26 near the upper end of belt 21 at the throat of feed trough 20. These drums 25 and 26 are supported for rotation on parallel horizontal axes disposed transversely of belt 21 and are power driven. They cooperate with the endless feed apron in feeding the hay up through the feed trough to the hay cutter or chopper and they exercise the further function of accumulating and compacting a storage pile of hay between them and apron 21, which makes it practical to run the machine over the ground with the feeding apron and the cutter operating at speeds compatible with maximum efficiency and the fineness of cut desired.

The feed trough

The feed trough 20 which, as indicated, extends between the hay pickup means and the ensilage cutter may be of any conventional, standard or suitable construction. Its essential characteristics are that it provides a channel or guideway for the hay between the hay pickup means and the cutter. As such it must, of course, have a suitable bottom with the feeding apron working up along the same and with side walls to contain or hold the hay in the confined space of its travel and which also may be flanged for purposes of strength and for the purposes that will be hereinafter referred to.

The ensilage cutter

The ensilage cutter 14 may be of any suitable or conventional construction. For example, it may be of the type described and claimed in my United States Letters Patent 1,793,476 granted February 24, 1931 for an ensilage cutter. As illustrated generally in the drawings, the ensilage cutter 14 includes a blower housing 30 supported on and secured to the chassis or mobile frame 10 of the machine M and containing interiorly a rotor 31 carrying the usual fan blades 32 and rotary cutters (not shown). The rotary cutters coact in the usual way with the fixed cutter or ledger blade (also not shown). The blower housing has a suitable inlet into which the hay is fed by the endless conveyor or feed apron 21. The rotor 31 is fixed to a drive shaft 33 rotatably supported in suitable bearings provided therefor on the blower housing.

Conventional beater rolls

At the upper end of the feed trough 20 the conventional beater rolls 34, 35 and 36, illustrated diagrammatically in Fig. 6, are provided.

The auxiliary beater or feed rolls or drums

The large auxiliary beater roll or drum 25 is fixed to a rotatably supporting shaft 25'. Similarly, the small beater roll or drum is fixed to a rotatably supported shaft 26'. The shaft 25' is rotatably mounted on suitable bearings 38. The bearings 38 are in the form of brackets, shown to advantage in Fig. 2, and riveted or otherwise suitably secured to the outer ends of supporting arms 39. The inner ends of these supporting arms 39 are welded or otherwise suitably fixed to a tubular or hollow supporting shaft 46 (see Figs. 2 and 8). The hollow supporting shaft 46 is in turn rotatably mounted in suitable bearings provided therefor at the upper ends of inclined supporting standards 41. The standards 41 have their lower ends rigidly interconnected with the structural element of the frame or chassis of the machine and are further maintained in position by means of suitable braces or struts 42. There are two of these supporting standards 41, one at each side of the feed trough.

The extent to which the large beater of feed roll or drum 25 may move toward the feed apron 21 is manually controlled. One way in which this may be conveniently accomplished is shown in the drawings and includes simply a rod-like handle or arm 43 which has one end welded or otherwise fixed to the hollow shaft 46 (see Fig. 8). As may be clearly seen in Fig. 2, the handle or controlling arm 43 is reversely bent and its outer end, adjacent the extreme outer portion thereof which is adapted to be grasped by the hand, is selectively engageable in any one of a series of vertically spaced hook-like keepers 44 which are suitably attached to an upright 45 fastened at its lower end to a structural element of the chassis 10 of the machine M.

Supporting arms 47 are provided for the purpose of rotatably supporting the small beater or feed drum 26. At one end each of these arms is rotatably and loosely mounted on the tubular or sleeve shaft 46. At the opposite end of each supporting arm a bearing is provided and rotatably interfits with the shaft 26' of the small feed or beater drum 26. The bearings which supports the shaft 26' are in vertical alignment with the flanged tops of the side walls of the feed trough and so serve not only the purpose of rotatably mounting the small feed or beater drum 26 but also act as stops to limit the extent to which the small feed or beater roll 26 may move toward the feed apron or endless conveyor 21, the outside surface of the bearings coacting or conjointly functioning with the tops of the side walls of the feed trough to exert their limiting or stopping function.

Power plant

The power plant or source of energy utilized to drive the various instrumentalities of the machine M may conveniently be an internal combustion engine such as a gasoline engine or Diesel engine designated generally at 50. The crank shaft of this engine is equipped with an extension shaft 51 which acts through the suitable motion intermission train such as multiple belt and pulley drive 52 to actuate or drive the shaft 33 of the ensilage cutter 14. This shaft 33 projects forwardly of the ensilage cutter housing and from it the motion is taken to drive the various other instrumentalities of the machine M.

The drive lines

The drive line to the ensilage cutter has been described. For the purpose of driving the other instrumentalities chain and sprocket gearing 55 operatively interconnects the forward end of the shaft 33 with a speed reducer 56. This speed reducer is equipped with two output shafts, one designated at 57 and the other at 58. The output shaft 57, with its bearings, provides the support and drive for the lower feed roll 34 and this shaft 57 also acts through chain and sprocket gearing 60 to actuate the driving pulley 61 for the endless belt or feed apron 21. The output shaft 58 drives the small conventional upper beater roll 35 and the shaft thereof in turn drives the large upper conventional beater roll 36 through chain and sprocket gearing 62. The change speed or speed reducing gear 56 is also equipped with an output or driving sprocket 63 which acts through chain and sprocket gearing 64 to drive a shaft 40 rotatably supported in the hollow or sleeve shaft 46. Belt and pulley gearing 66 and 67 serve to drive the large and small auxiliary beater or feed drums 25 and 26, respectively, from shaft 40 and this at the proper differential or ratio in respect to speeds.

Figure 2:
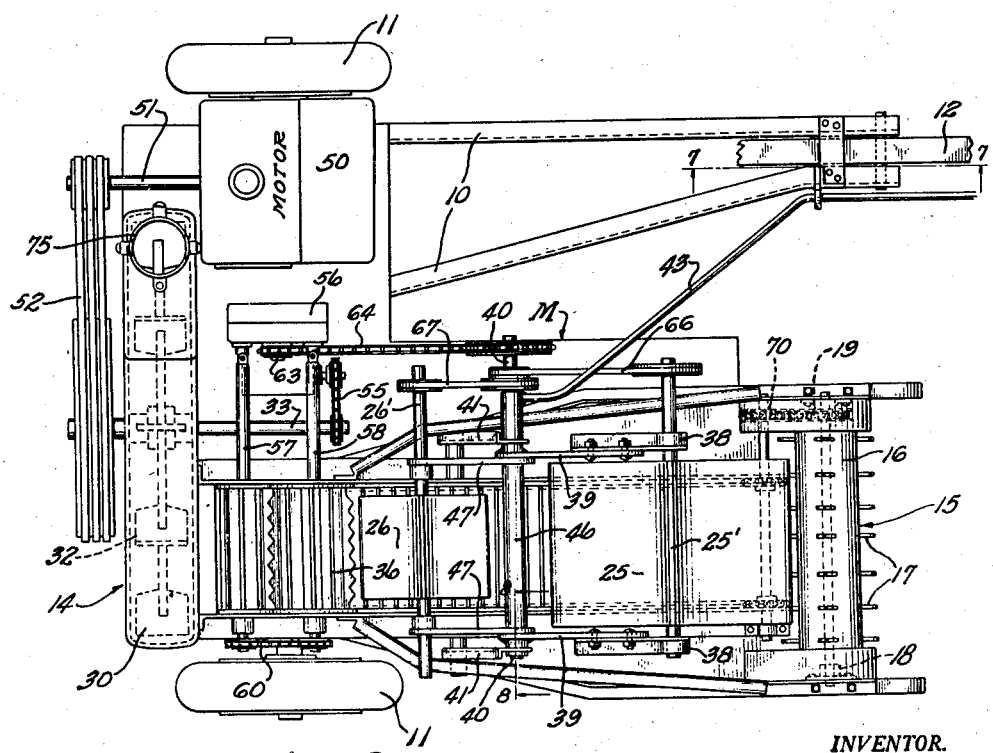
Fig. 2 is a top plan view of the machine.

The drive for the hay pickup means may be taken from the shaft of the driven pulley of the endless conveyor or feed apron 21 and this may be conveniently done through chain and sprocket gearing 70 (see Fig. 2).

Delivery spout

The ensilage cutter 14 is provided with an outlet 75. An arched or curved delivery spout 76 is provided and is suitably connected to the outlet 75 of the blower housing of the ensilage cutter. The connection between this delivery spout and the outlet is preferably of a swivel character so that the spout may be angularly adjusted to deliver the properly chopped fodder, feed, or ensilage to the trailer or wagon W as shown in Fig. 1 which, in the illustration, is in tandem relation to the machine M, or the spout may be angularly adjusted to deliver the feed or fodder to a wagon which is pulled alongside the machine but which is not shown. A brace or strut 77 is suitably supported at its lower end on a fixed part of the machine M and has its upper end in supporting inter-engagement with the underside of the intermediate portion of the delivery spout.

Operation

When the machine is in use it is pulled across the field by the tractor T and the internal combustion engine 50 is running. As a result, the hay pickup means picks up the cut hay and throws it quite rapidly into the feed trough. In the feed trough the hay is advanced upwardly by the endless apron 21 and through the conventional beater rolls into the ensilage cutter 14 where it is chopped up and blown out through the delivery spout 76 into the trailer or wagon W. During the course of its travel through the feed trough the hay is subjected to the action of the auxiliary beater or control drums 25 and 26 which function in the manner previously described to coordinate the gathering of the hay with the capacity of the ensilage cutter to chop it up.

The pick-up 15 is rotated in a direction opposite to that for wheels 11 so that the teeth 17 rake the ground and tend to pick up all loose hay available and to carry the same upwardly over the roll 16 and into the wide lower end of trough 20.

The large beater drum 25 is disposed to ride or float upon the loose hay and to pack it down onto conveyor 21 which moves upwardly through the trough. The peripheral speed for drum 25 may correspond to that of pick-up 15 so that the drum quickly grasps the incoming hay and moves it forwardly up the trough 20.

The trough 20 is tapered in width from a wide dimension at the pick-up 15 to a narrow throat approximating the width of the conveyor belt 21 at cutter 14. The actual speed of travel of belt 21 will depend upon the length of cut desired and, in general, it will be substantially slower than the peripheral speed of pick-up 15 and drum 25.

The construction of the drum 25 is such as to effect a compacting of the hay between it and the conveyor 21. For this purpose the periphery of the drum is not cylindrical, but is provided with a plurality of curved scallops or recesses extending uniformly across the length of the drum and presenting gradually tapered hay engaging teeth which are smooth and free from any catches upon which the hay might wind. The teeth of the drum are spaced substantially circumferentially of the drum to give a somewhat star-shaped appearance.

In operation the teeth of drum 25 press downwardly into the loose hay and move the same bodily upwardly of the trough 20 as the drum rotates. The shape of the teeth enables them to readily release the hay and prevent any tendency of it to carry on over the top of the drum.

Drum 26 is shaped similar to drum 25 and is preferably of smaller diameter to have a peripheral speed corresponding to the speed of apron 21. Drum 26 serves to additionally pack the hay as it reaches the throat of trough 20 so that it can be fed efficiently through the feed rolls 34 and 35 into cutter 14.

While I have shown and described one embodiment of my invention and this in a form which may be advantageously used in practice, it is to be understood that the form shown and particularly described has been selected solely for the purposes of illustration, and that various changes in the size, shape, and arrangement of parts may be resorted to without departing from the inventive concept and the scope of the appended claims.

What I claim is:

1. A machine for harvesting hay comprising a mobile frame, an endless conveyor supported on the frame and extending lengthwise thereof, said conveyor angling upwardly from a point adjacent the forward end of the frame to a point adjacent the rear end thereof; a drum rotatably supported on the low forward end of the frame and extending transversely thereof and having rows of pickup fingers operative to pick cut off hay from the ground and deposit it on the low forward end of the endless conveyor, an ensilage cutter supported on the frame and receiving the hay discharged from the high rearward end of the endless conveyor, and means for controlling the rate of feed of the hay from the endless conveyor to the ensilage cutter and comprising a pair of rotary drums supported above the endless conveyor for rotation about axes extending parallel to each other and transversely of the endless conveyor, the drum remote from the ensilage cutter being larger than the one adjacent thereto, the two drums cooperative to build up a pile of hay between them from which pile the endless conveyor feeds hay into the ensilage cutter.

2. A machine for harvesting hay comprising a mobile frame, an endless conveyor supported on the frame and extending lengthwise thereof, said conveyor angling upwardly from a point adjacent the forward end of the frame to a point adjacent the rear end thereof; a drum rotatably supported on the low forward end of the frame and extending transversely thereof and having rows of pickup fingers operative to pick cut off hay from the ground and deposit it on the low end of the endless conveyor, an ensilage cutter supported on the frame and receiving the hay discharged from the high rearward end of the endless conveyor, and means for controlling the rate of feed of the hay from the endless conveyor to the ensilage cutter and comprising a pair of rotary drums supported above the endless conveyor for rotation about axes extending parallel to each other and transversely of the endless conveyor, the drum remote from the ensilage cutter being larger than the one adjacent thereto, the two drums cooperating to build up a pile of hay between them from which pile the endless conveyor feeds hay into the ensilage cutter, means supporting the drums for adjustment vertically toward and away from the endless conveyor, and a power driven motion transmission train for rotating the drums.

3. A machine for gathering and chopping cut hay from the field comprising a mobile frame, means at the forward end of the frame for picking up cut hay, an ensilage cutter at the rearward end of the frame, a feed trough extending between the means for picking up the hay and the ensilage cutter, and a continuously power driven hay compacting rotary drum overlying the feed trough and cooperating therewith to control the rate of feed of hay to the ensilage cutter but functioning to asssist in the feeding operation while accumulating a pile of hay in overlying and receptive relation to the feed trough.

4. A machine for gathering and chopping hay that has been cut in the field and raked into windrows and comprising a mobile frame, means for pulling the frame across the field in which the hay has been cut in windrows, a hay pickup means at the forward end of the machine, an ensilage cutter at the rearward end of the machine, a feed trough extending between the hay pickup means and the ensilage cutter, a conveying means for feeding the picked up hay through the feed trough to the ensilage cutter, and means for controlling the rate of feed of the hay through the feed trough comprising a pair of drums overlying the feed trough, means for supporting the drums for rotary movement above the feed trough, controllable means to regulate the distance to which the large forward drum may move toward the feed trough, means floatably supporting the small rear drum and cooperative with the walls of the feed trough to limit the distance to which the small drum may move toward the feed apron, means for driving the small drum at approximately the same rate of speed as the feed apron, and means for driving the large drum so that its peripheral speed is greater than that of the small drum whereby the hay will be assisted by the action of the drums in its travel through the feed trough under the influence of the feed apron and guidance of the feed trough and will be accumulated in a compact pile of surplus hay between the auxiliary drums.

5. A machine of the character described comprising a mobile frame, a rotary hay pickup drum at the forward end of the frame, an ensilage cutter carried by the rear end of the frame, a feed trough extending from the hay pickup drum to the ensilage cutter, an endless conveyor having its upper run extending along the bottom of the feed trough for feeding the hay picked up by the pickup drum to the ensilage cutter, a small beater roll supported for rotation adjacent to the inlet of the ensilage cutter and operating on the hay in the feed trough, means for driving said beater roll at the same speed as the endless conveyor, a larger beater roll positioned between the small beater roll and the pickup drum and also working on the hay being advanced through the feed trough, and means for driving the larger beater roll so that its peripheral speed is approximately equal to the ground speed of the machine whereby the hay fed through the feed trough is accumulated and compacted between the beater rolls to compensate for the difference between the ground speed of the machine and the capacity of the ensilage cutter and to insure the cutting of the hay to the desired length.

6. A machine of the character described comprising a mobile frame, hay pickup means at the forward end of the frame, an ensilage cutter carried by the rear end of the frame, a feed trough extending between the hay pickup means and the feed trough, means for feeding hay through the feed trough from the hay pickup means to the ensilage cutter, and mechanism for controlling the rate of feed of the hay to the inlet of the ensilage cutter independently of the rate of pick-up of the hay and comprising a pair of beater rolls of different diameters, the beater roll of the largest diameter being driven at a higher peripheral speed than the speed of the hay feeding means, the roll of smaller diameter being driven at substantially the same peripheral speed as the speed of the hay feeding means so as to function to accumulate a surplus of hay between them and simultaneously to supply compacted hay to be cut to the ensilage cutter at a rate corresponding to its optimum capacity thereof for a cut of suitable length.

7. A machine for gathering and cutting hay that has been cut in the field and raked into windrows and comprising a mobile frame, means for pulling the frame across said field, hay pickup means at the forward end of the frame, an ensilage cutter at the rearward end of the frame, a feed trough extending between the hay pickup means and the ensilage cutter, conveying means for feeding the picked up hay through the feed trough to the ensilage cutter, and mechanism for coordinating the rate at which the hay is picked up in the field and the rate at which it is fed to the ensilage cutter and comprising a pair of beater rolls of different diameters, the smaller beater roll being located adjacent the ensilage cutter and the two functioning to assist the feeding action of the hay through the trough and also accumulating and compacting the hay in a pile or surplus between them.

8. A machine for gathering and cutting hay that has been cut in the field and raked into windrows and comprising a mobile frame, means for pulling the frame across the field in which the hay has been cut in windrows, a hay pickup means at the forward end of the machine, an ensilage cutter at the rearward end of the machine, a feed trough extending between the hay pickup means and the ensilage cutter, a conveying means for feeding the picked up hay through the feed trough to the ensilage cutter, and means for controlling the rate of feed of the hay through the feed trough and comprising a pair of beater rolls of different diameters, said beater rolls overlying the feed trough and mounted to float on the hay fed thereto, manually controllable means to regulate the distance to which the large drum may move toward the feed trough and means for limiting the extent to which the small drum may move toward the feed trough.

9. A machine for gathering and cutting hay that has been cut in the field and raked into windrows and comprising a mobile frame, means for pulling the frame across the field, hay pickup means at the forward end of the frame, an ensilage cutter carried by the frame, a feed trough extending between the hay pickup means and the ensilage cutter, conveying means for feeding the picked up hay through the feed trough into the ensilage cutter, means for controlling the rate of feed of the hay through the feed trough and comprising a pair of drums overlying the feed trough, means for floatably supporting the drums on the hay for rotary movement above the feed trough, means for driving the drums, and means for limiting the extent of the movement of the drums toward the conveying means of the feed trough.

10. A machine for gathering and cutting hay that has been cut in the field and raked into windrows and comprising a mobile frame, means for pulling the frame across the field in which the hay has been cut in windrows, a hay pickup means at the forward end of the machine, an ensilage cutter at the rearward end of the machine, a feed trough extending between the hay pickup means and the ensilage cutter, a conveying means for feeding the picked up hay through the feed trough to the ensilage cutter, and means for controlling the rate of feed of the hay through the feed trough, and comprising a pair of auxiliary feed drums of different diameters and disposed to float on the hay being fed through the feed trough, a common supporting shaft for the drums, a pair of supporting arms for the large drum having fixed connection with the shaft, a pair of supporting arms for the small drum loosely mounted on the shaft, means for driving the drums, and manually controllable means for limiting the extent to which the large drum may move toward the feed conveying means, the supporting arms for the small drum having means thereon engageable with the feed trough to limit the extent of movement of the small drum toward the conveying means.

11. A machine for gathering and cutting hay that has been cut in the field and raked into windrows and comprising a mobile frame, means for pulling the frame across the field in which the hay has been cut in windrows, a hay pickup means at the forward end of the machine, an ensilage cutter at the rearward end of the machine, a feed trough extending between the hay pickup means and the ensilage cutter, a conveying means for feeding the picked up hay through the feed trough to the ensilage cutter, and means for controlling the rate of feed of the hay through the feed trough, and comprising a pair of auxiliary feed drums of different diameters and disposed to float on the hay being fed through the feed trough, a common supporting shaft for the drums, a pair of supporting arms for the large drum having fixed connection with the shaft, a pair of supporting arms for the small drum loosely mounted on the shaft, means for driving the drums, manually controllable means for limiting the extent to which the large drum may move toward the feed conveying means, and comprising a handle fixed to the shaft and extending to a point within convenient control of the operator, and a standard carried by said frame and having a vertical series of upwardly opening keepers with which the handle is selectively engageable.

12. A machine for gathering and cutting hay that has been cut in the field and raked into windrows and comprising a mobile frame, means for pulling the frame across the field in which the hay has been cut in windrows, a hay pickup means at the forward end of the machine, an ensilage cutter at the rearward end of the machine, a feed trough extending between the hay pickup means and the ensilage cutter, a conveying means for feeding the picked up hay through the feed trough to the ensilage cutter, and means for controlling the rate of feed of the hay through the feed trough, and comprising a pair of auxiliary feed drums of different diameters and disposed to float on the hay being fed through the feed trough, the smaller drum being disposed adjacent the ensilage cutter, a common hollow supporting shaft for said drums rotatably mounted on the mobile frame, a pair of supporting arms for the large drum having fixed connection with said shaft, a pair of supporting arms for the small drum loosely mounted on the shaft, means for limiting the extent of movement of the drums toward the conveying means, and means for driving the drums at the proper speeds including a countershaft rotatably supported in the hollow shaft and gearing actuating the drums from the countershaft.

13. A machine for gathering and cutting hay that has been cut in the field and raked into windrows and comprising a mobile frame, means for pulling the frame across the field in which the hay has been cut in windrows, a hay pickup means at the forward end of the machine, an ensilage cutter at the rearward end of the machine, a feed trough extending between the hay pickup means and the ensilage cutter, a conveying means for feeding the picked up hay through the feed trough to the ensilage cutter, and means for controlling the rate of feed of the hay through the feed trough, and comprising a pair of auxiliary rolls of different diameters, overlying the feed trough, floatably contacting the hay and driven at different speeds to assist the feed of the hay while accumulating a pile of hay between them.

14. In a hay chopper or the like for mobile field operation, a mobile frame, hay pick-up means, hay conditioning means spaced rearwardly of said pick-up means, a feed trough extending between said pick-up means and conditioning means and tapering in width to a throat section at its rear end, and a hay compacting continuously power driven drum disposed to float on the hay delivered to the trough by said pick-up means, said drum being rotated in a direction to transfer the hay into said throat for delivery to said conditioning means and to compact the loose hay for passage through said throat.

15. In a hay chopper for mobile field operation, a mobile frame, hay pick-up means, hay cutter means spaced rearwardly of said pick-up means, a feed trough extending between said pick-up means and cutter means and tapering in width to a throat section at its rear end, an endless belt conveyor extending longitudinally of said trough and driven in a direction to transfer hay from said pick-up means to said cutter means at a rate determining the fineness of cut, and a hay compacting continuously power driven drum disposed in said trough to float on the hay, said drum being rotated in a direction to cooperate with said conveyor and to effect compacting of the hay for passage through said throat and for compensating between the rate of pick-up and the rate of feed to effect delivery of a continuous and more uniform mass of compact hay to the cutter means.

16. In a hay chopper or the like for mobile field operation, a mobile frame, hay pick-up means, hay conditioning means spaced rearwardly of said pick-up means, a feed trough extending between said pick-up means and conditioning means and tapering in width to a throat section at its rear end, a rotary drum disposed in said trough with its axis transverse thereto and with its periphery provided with large self-cleaning scallop-like transverse indentations, and means to rotate said drum in a direction to transfer the hay into the throat of said trough for delivery to said conditioning means and to compact the loose hay for passage through said throat.

17. In a hay chopper for mobile field operation, a mobile frame, hay pick-up means, hay conditioning means spaced rearwardly of said pick-up means, a feed trough extending between said pick-up means and conditioning means and tapering in width to a throat section at its rear end, a rotary drum disposed in said trough with its axis transverse thereto and with its periphery provided with large self-cleaning scallop-like transverse indentations, means to rotate said drum in a direction to transfer the hay into the throat of said trough for delivery to said conditioning means and to compact the loose hay for passage through said throat, and means mounting said drum for vertical floating action on the hay.

18. In a hay chopper for mobile field operation, a mobile frame, hay pick-up means, hay cutter means spaced rearwardly of said pick-up means, a feed trough extending between said pick-up means and cutter means and tapering in width to a throat section at its rear end, an endless belt conveyor extending longitudinally of said trough and driven in a direction to transfer hay from said pick-up means to said cutter means at a rate determining the fineness of cut, a rotary drum disposed in said trough with its axis transverse thereto and with its periphery provided with large self-cleaning scallop-like transverse indentations, and means to rotate said drum in a direction to transfer the hay into the throat of said trough for delivery to said cutter means and to compact the loose hay for passage through said throat.

19. In a hay chopper for mobile field operation, a mobile frame, hay pick-up means, hay cutter means spaced rearwardly of said pick-up means, a feed trough extending between said pick-up means and cutter means and tapering in width to a throat section at its rear end, an endless belt conveyor extending longitudinally of said trough and driven in a direction to transfer hay from said pick-up means to said cutter means at a rate determining the fineness of cut, a rotary drum disposed in said trough with its axis transverse thereto and with its periphery provided with large self-cleaning scallop-like transverse indentations, means to rotate said drum in a direction to transfer the hay into the throat of said trough for delivery to said cutter means and to compact the loose hay for passage through said throat, and means mounting said drum for vertical floating action on the hay.

HENRY M. GEHL.

REFERENCES CITED

The following references are of record in the file of this patent:

UNITED STATES PATENTS

| Number | Name | Date |
| --- | --- | --- |
| 2,199,257 | Ferrin | Apr. 30, 1940 |
| 2,199,629 | Heth et al. | May 7, 1940 |
| 2,301,873 | Heth et al. | Nov. 10, 1942 |
| 2,347,907 | Hill | May 2, 1944 |
| 2,349,386 | Stoetzel et al. | May 23, 1944 |
| 2,394,996 | Hill et al. | Feb. 19, 1946 |